United States Patent [19]

Simmons

[11] Patent Number: 5,435,115
[45] Date of Patent: Jul. 25, 1995

[54] VACUUM PACKAGING MACHINE

[75] Inventor: Robert J. Simmons, Cwmbran, England

[73] Assignee: Burton's Gold Medal Biscuits Limited, London, England

[21] Appl. No.: 287,177

[22] Filed: Aug. 8, 1994

[30] Foreign Application Priority Data

Aug. 10, 1993 [GB] United Kingdom ............. 9316594
Jun. 16, 1994 [GB] United Kingdom ............. 9412061

[51] Int. Cl.⁶ .................... B65B 31/06; B65B 9/06
[52] U.S. Cl. .............................. 53/511; 53/550; 53/374.4
[58] Field of Search ............ 53/511, 550, 551, 552, 53/433, 450, 374.4

[56] References Cited

U.S. PATENT DOCUMENTS

| | | | |
|---|---|---|---|
| 3,274,746 | 9/1966 | James et al. | 53/511 X |
| 3,735,551 | 5/1973 | Pratt | 53/511 X |
| 4,170,863 | 10/1979 | Schwanz | 53/511 |
| 4,272,944 | 6/1981 | Suga | 53/511 |
| 5,052,166 | 10/1991 | Ziegler et al. | 53/511 |
| 5,311,726 | 5/1994 | Rauscher et al. | 53/511 |

FOREIGN PATENT DOCUMENTS 2246998  2/1992  United Kingdom .

Primary Examiner—Horace M. Culver
Attorney, Agent, or Firm—Rankin, Hill, Lewis & Clark

[57] ABSTRACT

A packaging machine (1) is adapted to form a web (8) of packaging material into a tube to surround items (3) to be packed, the tube then being sealed and severed between successive items to produce individual packages (5). The tube is formed by sealing one surface of an edge zone of the web to the same surface of the opposite edge zone of the web so that, in the finished package, the sealed zones form a flap extending longitudinally of the package. The machine comprises a machine bed (2) and successive pairs of rollers (18,20,22) located in the machine bed forming successive nips for driving the partly formed packages (25,38) towards a sealing and severing station (23) and for forming the required seal between the edge zones of the web, wherein the edge of at least one of at least one of the pairs of rollers (18;20), located adjacent the partly formed packages, is relieved whereby an air passage is formed within the tube at the point where the tube passes the relevant pair of rollers as it moves towards the sealing and severing station (23). The machine additionally comprises means (32,34) for applying a vacuum to the tube adjacent the point where the edge zones of the web are brought together to form the tube.

7 Claims, 4 Drawing Sheets

VACUUM PACKAGING MACHINE

This invention relates to a packaging machine, and more particularly to a packaging machine of the type in which a web of packaging material is formed into a tube to surround the items to be packed and the tube is then sealed and severed between successive items to produce individual packages. The invention is more particularly concerned with packaging machinery of this type in which the tube is formed by sealing one surface of an edge zone of the web to the same surface of the opposite edge zone of the web so that, in the finished package, the sealed zones form a flap extending longitudinally of the package.

Packaging machines of the type described above are commonly used in the food manufacturing industry, more particularly for the packaging of biscuits and similar items. For the purposes of illustration the invention will be described in the context of a biscuits packaging machine. It should be appreciated, however, that the invention is of more general applicability and may be used in a wide range of packaging machines of the type described above.

In the packaging of biscuits by such machines the biscuits may already be held in containers of card or plastics material, for example, or they may be loose and simply assembled together into groups, each group being intended to be packaged to form a single packet of biscuits. In the latter case, the packaging machine bed is horizontal and the biscuits are arranged vertically—i.e. the biscuits stand on edge—as they are fed into the packaging machine by means of a conveyor. The groups of biscuits are automatically spaced apart by a distance sufficient to enable the packaging tube, between consecutive groups of biscuits, to be sealed and severed to form the individual packets required.

In machines of the prior art, the apparatus for sealing and severing the tube to form individual packets is typically located several packet lengths downstream of the tube forming station. This arrangement leads to two recognized disadvantages. Firstly, between the tube forming station and the tube severing station the biscuits must be supported and maintained in their pre-formed groups. In particular, because the biscuits are standing on edge, care must be taken to prevent the leading or trailing biscuit in each group from falling over. Because, along the relevant portion of the machine length, the biscuits are totally enclosed by the tube it is not possible to support the biscuits directly by means of fingers extending from the conveyor. In the circumstances, conventional practice has been to provide a pair of chains, one each side of the line of the tube, to engage the lateral faces of the tube and maintain the biscuits in the correct position. Each time the packaging line is changed for a different type of biscuit the chains must be re-adjusted. This is a time consuming process and one which inevitably leads to certain waste production. Secondly, excessive amounts of air tend to be trapped within the finished packages with the result that subsequent handling and packing of the packages into outer cases or containers for transport is rendered difficult.

With a view to overcoming the problem of excessive air within the packages it has been proposed to apply a vacuum to the tube and, in a known arrangement, the vacuum is applied to the packaging tube adjacent the point where the lateral edges of the web are brought together to form the tube. The vacuum is simply applied by means of a suction chamber under the support surface on which the groups of biscuit move into and through the packaging machine. The conveyor feeds the groups of biscuits to the packaging machine and the end of the conveyor passes through the suction chamber, which is of sufficient size to accommodate the end roller of this conveyor. Whilst this proposal does, to an extent, reduce the amount of air contained in the final packages it does not completely eliminate the air problem. Firstly, because the conveyor passes through the suction chamber it is not possible to seal the suction chamber from the outside environment, so that it is difficult to obtain an effective vacuum without expending significant power. Secondly, it will be appreciated that, since the final sealing and severing station is located two or three package lengths downstream of the point where the vacuum is applied, it is difficult to expel air from the final package which is about to be closed and severed because of the intervening two or three groups of product located between the severing point and the point of application of vacuum. When the sealing and severing of the package end takes place, the air which is left between the groups of biscuits in the packaging web at the point where the package end is to be sealed and severed is forced back towards the groups of biscuits upstream causing puffing of the web. This puffing tends to disturb the biscuits, particularly the leading and trailing biscuits, in the upstream groups, causing them to fall over if external supports, such as side chains, are not provided.

In conventional machines, after the edge zones of the web have been brought together, the flap so formed is gripped between nips of successive pairs of rollers located beneath the support surface or machine bed on which the partly formed packages slide. These rollers drive the partly formed packages towards the sealing and severing station and, by applying pressure and/or heat to the packaging web located between the nips, the required seal between the lateral zones of the web is formed. If the web is to be sealed in a cold seal process, at least two pairs of rollers are preferred. Although only one pair of rollers may be necessary to form the seal, two pairs are preferred to provide sufficient pull to drive the partly formed packages of biscuits towards the sealing and severing station. If a heat seal process is to be used, it is preferred to provide at least two pairs of heated rollers to plasticize and seal the web, in which case at least one further pair of rollers needs to be provided to drive the partly formed packages towards the sealing and severing station.

We have now discovered that a substantial improvement in the air extraction from the final package can be achieved if the edge of at least one roller of at least the first pair of rollers downstream of the point of application of the suction is relieved whereby an air passage is formed within the tube at the point where the tube passes the relevant pair of rollers as it moves downstream in the machine direction.

In the preferred embodiment, the upper faces of the rollers form part of the support surface along which the tube and biscuits move.

In the preferred embodiment of the invention both of each pair of rollers at each nip, except the final nip, are relieved by a chamfer whereby, as the package passes each of the relieved rollers, a generally triangular zone is formed inside the web between the web lying against the chamfered rollers and the lower face of the product being packaged.

In the preferred embodiment of the invention the final pair of rollers, in the machine direction, are not relieved so that the final complete seal between the edge zones of the web is formed by the final nip.

It has been found that with a machine incorporating the present invention substantially all surplus air is removed from the final package before closing, sealing and severing, with the result that in the individual packages formed by the machine the packaging film closely conforms to the product within it. In addition, when the sealing and severing of the package end takes place, any small amounts of air left in the package are expelled towards the groups of product located between the severing point and the point of application of the vacuum, and the chamfered rollers allow this air to be passed back readily to the point of application of the vacuum, avoiding disturbance to the biscuits in the upstream groups.

A further and surprising advantage of the invention is that the improved air extraction provided by the relieved rollers causes the web, in the zones between the individual groups of product, to be sucked inwardly towards the centre of the tube, notwithstanding that the tube is maintained under tension as it is pulled through the machine line by the rollers. The effect of this partial collapse of the tube and the effective application of the vacuum is to prevent the biscuits forming each group from being displaced from the vertical array in which they are fed to the packaging station. Hence, the side chains previously required to maintain the biscuits in the desired orientation may be omitted, resulting in a general simplification of the machine and the removal of the undesirable setting step required in the prior art each time the product line being handled by the packaging machine changes.

A further and additional surprising advantage of the invention is that, as the tube collapses under the influence of the applied vacuum, gussets are automatically formed in the lateral edges of the tube. Heretofore, when packaging products of, for example, rectangular/cross-section it has been necessary to form gussets by mechanical gusseting fingers immediately prior to operation of the closing, sealing and severing machine. Since, in embodiments of the present invention, gussets are automatically formed by the collapsing tube, the previous requirement for gusseting fingers no longer exists.

It has also been discovered that a further improvement in air extraction can be achieved by applying the suction to the tube downstream of the end of the conveyor which feeds the groups of biscuits into the packaging machine, between the end of the conveyor and the first pair of rollers at which the edges of the web are brought together to form the tube. The known suction chamber is replaced with a small housing fitted beneath the support surface on which the groups of biscuits move. The housing, in combination with the support surface, substantially surrounds the point where the lateral edges of the web are brought together to form the packaging tube and is sufficiently small that the end roller of the conveyor does not interfere with the housing. The housing is located beneath slots in the support surface which bring the edges of the web together, and extends beneath the first pair of rollers to the point where the nip is formed between the first pair of rollers. A source of vacuum is applied to the housing and, because the housing and support surface substantially surround the point where the lateral edges of the web are brought together, there is little leakage from the surroundings into the evacuated housing and the vacuum source need be considerably less powerful than in known machines.

The invention will be better understood from the following description of a preferred embodiment thereof, given by way of example only, reference being had to the accompanying drawings wherein.

Figure 1:
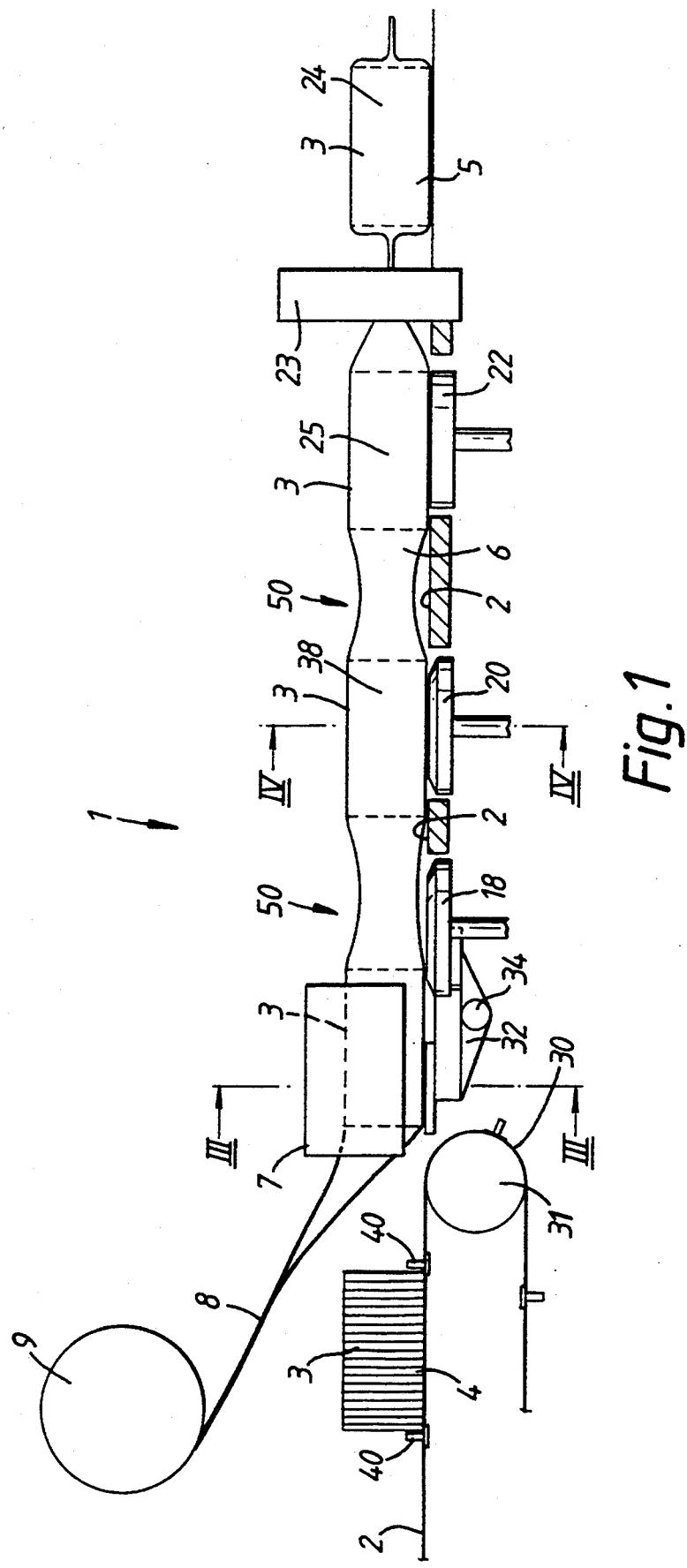
FIG. 1 shows schematically a side view of an embodiment of the invention.

Referring firstly to FIG. 1, a packaging machine 1 comprises a bed or support surface 2 along which groups 3 of a product 4 pass to form discrete packets 5 of product. Apparatus is provided upstream of the machine 1 for grouping the product 4 into the required groups 3, for spacing the groups apart for supply to the packaging machine, the groups being conveyed into the packaging machine by conveyor 30 which returns around end conveyor roller 31. The conveyor 30 may be provided with fingers 40 for supporting the groups 3 on the conveyor. Such apparatus will be well known to those skilled in the art and will not be described further here.

Figure 3:
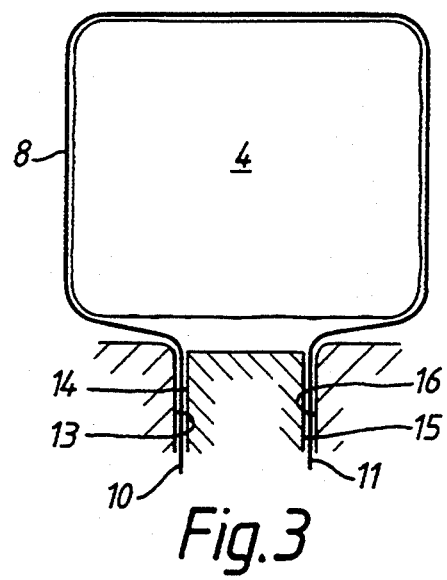
FIGS. 3 and 4 show schematic cross-sections on the lines III—III and IV—IV respectively of FIG. 1.
Figure 4:
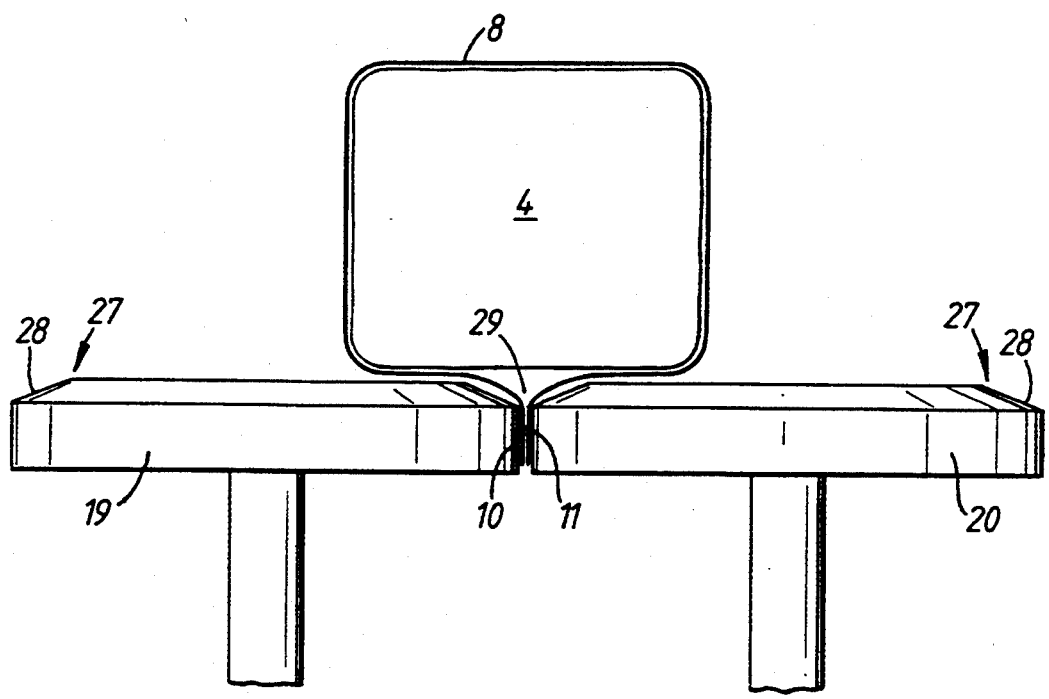
Figure 5:
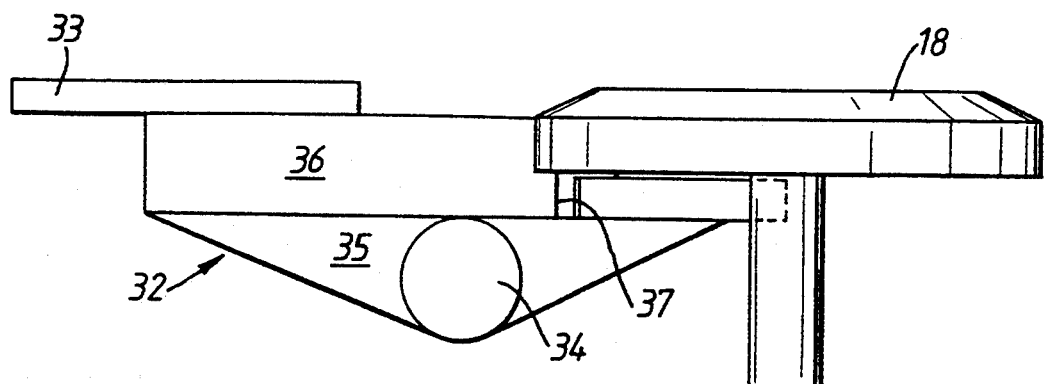
FIG. 5 shows a side view of details of the vacuum housing and first roller.
Figure 6:
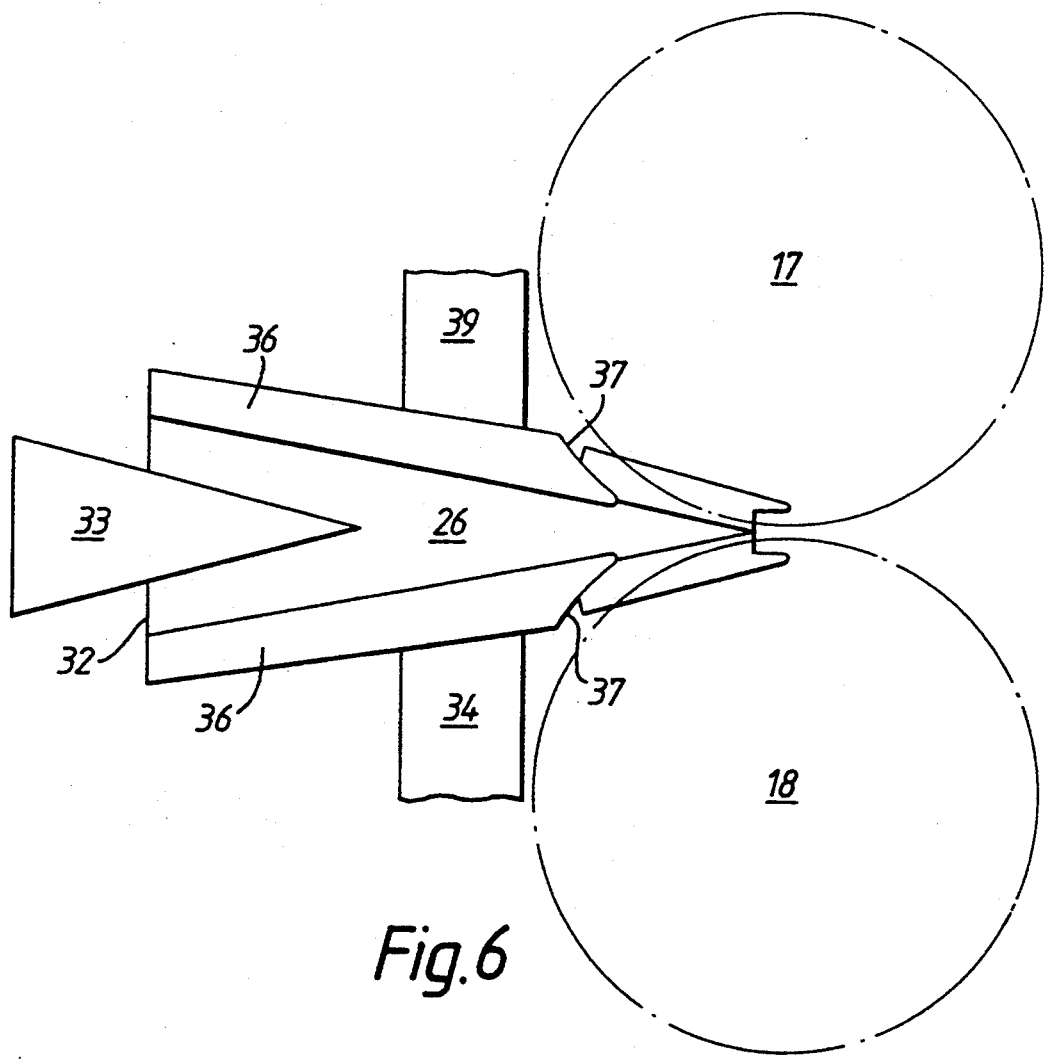
FIG. 6 is a top plan view of the details shown in FIG. 5.

As the product passes through the machine a tube 6 is formed about the successive groups 3 in a tube forming station 7. In the tube forming station 7, a web 8 is of, e.g., plastics film from a suitable supply reel 9 is guided and shaped into a tube. The tube is formed by bringing one face of one edge zone 10 of the web into engagement with the same face of the opposite edge zone 11 (see FIGS. 3 and 4). For this purpose, the web is initially deformed into a generally inverted U-shape and the edge zones 10,11 are fed between guides 13,14 (for the edge zone 10) and 15,16 (for the edge zone 11). The edge zones then pass into the nip between a pair of rollers 17,18 (see FIG. 2). The rollers 17,18 are driven and accordingly move the tube forward in the machine direction. In this embodiment two further pairs of rollers 19,20 and 21,22 are located downstream of the tube forming station. The top surface of each roller is level with the top surface of the machine bed, and forms part of the surface along which the tube moves, the machine bed being cut away to accommodate the rollers.

Located two or three package lengths downstream of the tube forming station is a tube closing, sealing and severing station 23 in which the tube is flattened to close it, sealed and severed through the seal, thereby simultaneously closing and severing the final package 24 from the tube and forming the leading closed and sealed end of the next package 25.

Figure 2:
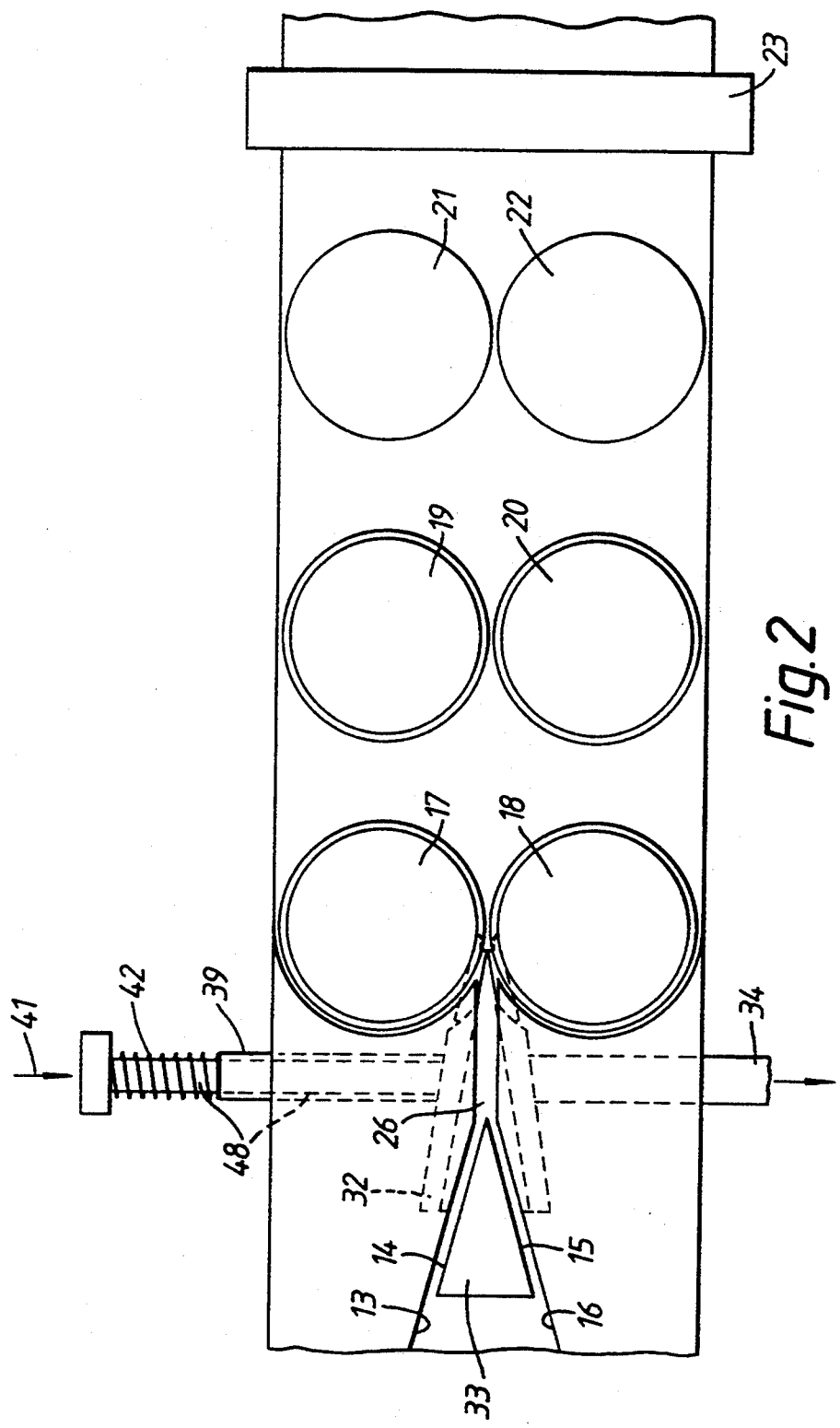
FIG. 2 shows schematically the machine bed of the embodiment of FIG. 1.

As more particularly shown in FIG. 2, a housing 32 is fitted downstream of the roller 31 and below the plate 33 forming the guides 14 and 15 forms a plenum 26 which is connected to a vacuum source via a tube or duct 34 to establish a sub-ambient pressure at the point of tube formation. It will be appreciated that because of the shape of the web at this point and the relatively fine nature of the web material only a limited vacuum can be drawn from the plenum 26. The housing 32 is fitted beneath the slots in the machine bed which form the guides for bringing the edges 10, 11 of the web together and then feeding the edges to the first rollers 17,18. The housing 32 extends below the first pair of rollers 17,18 to the point where the nip is formed between the two rollers 17,18. The sides 35 of the housing are shaped to abut against the underside of the machine bed 2 and the underside of the two rollers 17,18. Preferably, the sides 35 have top portions 36 formed from a plastics material for providing a more effective seal against the machine bed and the underside of the rollers. The top portions 36 are stepped at shoulder 37 to cooperate with the underside of the rollers and the machine bed. In addition, the vertical edge of each shoulder 37 is curved to cooperate with and abut the circumferential edge of roller 17 or 18, respectively. Thus, the housing 32 cooperates with the rollers and the machine bed substantially to surround the point where the edges 10, 11 of the web are brought together, so that a vacuum may be developed in the plenum 26 by connecting duct 34 to a vacuum source. Because the plenum 26 is sealed from the outside atmosphere save at the points where the web enters and leaves the housing 32, the vacuum can be provided by, for example, a relatively low powered fan operating at around 0.5 KW, or less.

In accordance with the present invention this limited vacuum is utilized in a particularly effective manner to eliminate excess air from the final package 24 so that in the completed and severed package the web material lies closely against the product which has been packed. To this end, the upper edges 27 of the rollers 17 and 18 and advantageously also rollers 19 and 20 are relieved with a chamfer 28 so that, as more particularly shown in FIG. 4, a generally triangular air passage 29 is formed between the product and the packaging web as the tube advances past the nip formed between rollers 17 and 18 and between rollers 19 and 20. The effect of this passage is to enhance substantially the effectiveness of the vacuum applied at the plenum 26 to the extent that the web, in the zone 50 between the successive groups 3 of product, tends to partially collapse as generally illustrated in FIG. 1. One effect of this is that the web itself holds the product in the required configuration and the side chains required in the prior art are no longer required. In addition, the final package is substantially devoid of excess air. Also, as the tube progressively collapses towards the closing, sealing and severing station 23, gussets are automatically formed in the side of the tube thereby obviating the previous requirement for gusseting apparatus. In addition, as the tube is closed, sealed and severed between packages 24 and 25, the tube is compressed in the closing, sealing and severing station 23 and a small amount of air is thus forced back into the incoming packages 25, 38 and so on. The chamfer in rollers 17,18,19 and 20 allows this air to pass readily through the incoming packages and to be extracted through plenum 26, without disturbing the biscuits in the incoming packages.

The chamfer in each roller 17–20 should be of sufficient angle to achieve a triangular air passage 29 of adequate size for effective air extraction, but if the chamfer is too steep the edges of the web will not track properly.

It will be noted that the final pair of rollers 21,22 do not posses the chamfer 28 of the preceding pairs of rollers. Accordingly, as the web passes through the final nip prior to the closing, sealing and severing station, the seal between the facing zones of the web is completed. It has been found that the lack of chamfer on the final pair of rollers 21,22 does not, as a practical matter, interfere with the air extraction process.

The vacuum duct 34 extends from one side of the housing 32. A further duct 39 may extend from the other side of the housing coaxially with duct 34, as shown in FIG. 2. Duct 39 houses a piston 48 which may be pushed in the direction of arrow 41 through the plenum 26 and into the mouth of duct 34 to clear any debris which may have collected and which may interfere with the formation of the vacuum. A biasing spring 42 then returns piston 40 to its retracted position.

While the invention has been described in the context of a biscuit packaging machine with three pairs of rollers, it would be equally applicable to machines with two pairs of rollers, in which case, only the first pair of rollers is provided with a chamfer, or to machines with more than three pairs of rollers, in which case at least the first pair of rollers, and preferably all but the last pair of rollers, are provided with a chamfer.

Whilst the invention has been described with particular reference to the packaging of biscuits it will be appreciated that it is of general applicability to many packaging applications in which product is packaged by first forming a tube about the product and then sealing the tube to form individual packages.

What is claimed is:

1. A packaging machine adapted to form a web of packaging material into a tube to surround items to be packaged, the tube then being closed, sealed and severed between successive items to produce individual packages, the web having a first and second surface and first and second longitudinal edge zones, the edge zones being brought together at a point and the tube being formed by sealing the first surface at the first edge zone of the web to the first surface at the second edge zone of the web so that, in a finished package, the sealed edge zones form a flap extending longitudinally of the package, the machine comprising a support surface and at least a first pair and a final pair of rollers forming successive nips for driving partly formed packages along the support surface towards a closing, sealing and severing station and for sealing the edge zones of the web, each roller having an upper surface and a lower surface separated by a circumferential face, and wherein the circumferential face of at least one roller of at least the first pair of rollers is relieved around the entire circumference at an edge between the circumferential face and the upper surface of the roller, whereby an air passage is formed within the tube at the nip where the tube passes at least the first pair of rollers as it moves towards the closing, sealing and severing station, the machine additionally comprising means for applying a vacuum to the tube adjacent the point where the edge zones of the web are brought together to form the tube.

2. A machine according to claim 1, wherein the rollers at each nip, except a final nip, are relieved by a chamfer whereby, as the package passes each of the relieved rollers, a generally triangular zone is formed inside the web between the web lying against the chamfered rollers and the lower face of the item being packaged.

3. A machine according to claim 1, wherein the top surface of each roller forms part of the support surface along which the partly formed packages move.

4. A machine according to claim 1, wherein the means for applying a vacuum comprises a housing which, in combination with the support surface, substantially surrounds the point where the edge zones of the web are brought together to form the tube.

5. A machine according to claim 4, wherein the support surface is provided with slots which form guides for bringing the edge zones of the web together to form the tube and wherein the housing is located beneath the slots and extends beneath the first pair of rollers to the point where the nip is formed between the first pair of rollers.

6. A machine according to claim 5, wherein the housing seals against the underside of the support surface and closely abuts the underside of the first pair of rollers.

7. A machine according to claim 1, comprising three successive pairs of rollers.

* * * * *